US009295266B2

(12) United States Patent
Caratan

(10) Patent No.: US 9,295,266 B2
(45) Date of Patent: Mar. 29, 2016

(54) PROCESS FOR THE SUBSTANTIAL PROLONGATION OF THE STORAGE LIFE OF GRAPES

(71) Applicant: BLANC VINEYARDS L.L.C., Delano, CA (US)

(72) Inventor: Anton G. Caratan, Delano, CA (US)

(73) Assignee: BLANC VINEYARDS L.L.C., Delano, CA (US)

( * ) Notice: Subject to any disclaimer, the term of this patent is extended or adjusted under 35 U.S.C. 154(b) by 0 days.

(21) Appl. No.: 14/223,710

(22) Filed: Mar. 24, 2014

(65) Prior Publication Data

US 2015/0264951 A1    Sep. 24, 2015

(51) Int. Cl.
*A23B 7/04*      (2006.01)
*B65B 31/02*   (2006.01)
(Continued)

(52) U.S. Cl.
CPC ............... *A23B 7/04* (2013.01); *A23B 7/0433* (2013.01); *A23B 7/148* (2013.01); *A23L 3/3418* (2013.01); *B65B 25/001* (2013.01); *B65B 31/02* (2013.01); *B65D 81/2069* (2013.01); *B65D 85/34* (2013.01); *A23B 4/068* (2013.01); *A23L 3/365* (2013.01); *A23V 2002/00* (2013.01)

(58) Field of Classification Search
CPC ..... A23L 3/365; A23L 3/4318; B65B 25/001; B65B 31/02; A23B 4/068; A23B 7/0433; B65D 81/2069; B65D 85/34
USPC ......... 426/327, 316, 392, 393, 108, 418, 419, 426/118, 312
See application file for complete search history.

(56) References Cited

U.S. PATENT DOCUMENTS 4,423,080 A * 12/1983 Bedrosian et al. ............ 426/124
4,943,440 A    7/1990 Armstrong
(Continued)

FOREIGN PATENT DOCUMENTS

JP    2008273627 A    11/2008

OTHER PUBLICATIONS

Transportation Information Service ("Grapes"), Published Sep. 3, 2002, http://web.archive.org/web/20020903110106/http://www.tis-gdv.de/tis_e/ware/obst/weintrau/weintrau.htm.*
(Continued)

*Primary Examiner* — Drew Becker
*Assistant Examiner* — Bryan Kim
(74) *Attorney, Agent, or Firm* — Buchanan, Ingersoll & Rooney PC

(57) ABSTRACT

Grapes while attached to the stems where they formed are cooled with the removal of excess moisture and are enclosed within an enclosure containing a gaseous atmosphere (e.g., air) bounded by a semi-permeable film having an oxygen transmission rate of approximately 100 to 400 $cm^3$-mil/$m^2$/24 hr., and preferably approximately 260 to 325 $cm^3$-mil/$m^2$/24 hr. The enclosure is sealed and the concentration of carbon dioxide present therein is adjusted to an initial concentration of approximately 3 to 19 percent by volume (preferably 13 to 18 percent by volume). The initial concentration of carbon dioxide within the specified semi-permeable enclosure has been found to well prolong the storage life of the grapes stored therein at a temperature of approximately 31 to 35° F. with the advantageous promotion of continued grape respiration at a low level during storage. The grape quality for the intended end use (e.g., human consumption as a table grape) is effectively extended. Prolonged storage for 30 or 60 days or more in the storage zone is made possible. Accordingly, the time for the otherwise perishable grapes to serve their intended use is effectively extended in a straightforward and economical manner while using otherwise standard cold storage conditions.

17 Claims, 3 Drawing Sheets

(51) Int. Cl.

| | |
|---|---|
| *B65D 85/34* | (2006.01) |
| *B65D 81/20* | (2006.01) |
| *B65B 25/00* | (2006.01) |
| *A23L 3/3418* | (2006.01) |
| *A23B 7/148* | (2006.01) |
| *A23B 4/06* | (2006.01) |
| *A23L 3/365* | (2006.01) |

(56) References Cited

U.S. PATENT DOCUMENTS

| | | | |
|---|---|---|---|
| 5,609,293 A * | 3/1997 | Wu et al. | 229/5.81 |
| 5,945,147 A * | 8/1999 | Borchard | 426/393 |
| 6,045,838 A | 4/2000 | Davis et al. | |
| 6,305,148 B1 | 10/2001 | Bowden et al. | |
| 6,685,012 B2 | 2/2004 | Bowden et al. | |
| 7,007,802 B1 | 3/2006 | Moorman et al. | |
| 7,644,560 B2 | 1/2010 | Bowden et al. | |
| 8,024,912 B2 | 9/2011 | MacLeod et al. | |
| 8,256,190 B2 | 9/2012 | Bowden et al. | |
| 2006/0233922 A1* | 10/2006 | Kegler et al. | 426/106 |
| 2008/0308439 A1* | 12/2008 | Lidster et al. | 206/423 |
| 2010/0127059 A1* | 5/2010 | Lim et al. | 229/125.33 |
| 2013/0205717 A1 | 8/2013 | Bowden et al. | |

OTHER PUBLICATIONS

Crisosto et al., "New Table Grape Postharvest Technologies," pages.

Crisosto et al., "Table Grapes Postharvest Quality Maintenance Guidelines," 10 pages.

Crisosto, "Role of Temperature Management on Maintaining Table Grapes Quality," pp. 1-9.

Crisosto, et al., "Table Grape Packaging Influences 'Flame Seedless' and 'Redglobe' Storage Quality," University of California, Central Valley Postharvest Newsletter, vol. 10, No. 3, pp. 1-8, Nov. 2001.

Crisosto, et al., "Maintaining Table Grape Post-Harvest Quality for Long Distant Markets," International Symposium on Table Grape Production, pp. 195-199, 1994.

Crisosto, et al., "Table grapes suffer water loss, stem browning during cooling delays," California Agriculture, pp. 39-42, Jan.-Feb. 2001.

Artes-Hernandez, et al., "Enriched ozone atmosphere enhances bioactive phenolics in seedless table grapes after prolonged shelf life," J. Sci. Food Agric. 87:824-831, 2007.

Klaasen, et al., "Long-Term Storage Quality of Table Grapes as Influenced by Pre-Harvest Yeast Applications and Post-Harvest use of Controlled Atmosphere," S. Afr. J. Enol. Vitic., vol. 27, No. 2, pp. 187-195, 2006.

Crisosto, et al., "Developing Optimal Controlled Atmosphere Conditions for 'Thompson Seedless' Table Grapes," Proc. $8^{th}$ Int. CA Conference, pp. 817-821, 2003.

Abdellatief, et al., "Comparison of New Dynamic Accumulation Method for Measuring Oxygen Transmission Rate of Packaging against the Steady-State Method Described by ASTM D3985," Packag. Technol. Sci., 8 pages, 2012.

Crisosto et al. High Carbon Dioxide Atmospheres Affect Stored 'Thompson Seedless' Table Grapes. HortiScience vol. 37(7), pp. 1074-1078. Dec. 2002 (5 pages).

International Search Report and Written Opinion mailed Jun. 18, 2015 in corresponding PCT Application No. PCT/US2015/020874, (12 pages).

\* cited by examiner

PROCESS FOR THE SUBSTANTIAL PROLONGATION OF THE STORAGE LIFE OF GRAPES

BACKGROUND OF THE INVENTION

The fruit of the Genus *Vitis* is prized for its attractive appearance, firm texture, and flavor provided during fresh table grape consumption, and for the qualities needed for the production of quality juice or wine. However, it is well known that the shelf-life in which quality is maintained for the inevitably perishable freshly-harvested grapes has often tended to be relatively short, e.g., often approximately 14 to commonly less than 30 days depending on the packaging and storage techniques. This has necessitated prompt utilization by the grape consumer immediately following what is sometimes a brief time window for optimum grape harvest. It is recognized that consumers of fresh table grapes can be expected to demand a quality overall appearance, flavor, pliable green stems, and firm texture at the time of purchase, and at the time for consumption soon thereafter. This often translates into a minimum time window for the provider of freshly-harvested grapes to place the grapes on the market following the time for optimum harvest. The required transportation time and mode of transport to the point of sale or consumption further must be taken into consideration.

Various techniques have been proposed in the past to seek to extend the shelf life of freshly-harvested grapes. These have sometimes involved the lowering of the temperature during storage, and the use of high-speed circulating air along with periodic injections of sulfur dioxide in an effort to control fungal pathogens. Such high-speed circulating air often has caused the grape stems to dry out and for the fruit to wither somewhat. Also, the sulfur dioxide in view of its inherently corrosive nature often has caused fruit damage by weakening the skin of the grapes as well as weakening the integrity of the stems. The grapes accordingly become during such storage even further vulnerable to deleterious attack by fungal spores. Additionally, the sulfur dioxide has the propensity to bleach the skin of the grapes thereby rendering the lightening of the pigment of colored grapes and rendering white grapes somewhat orange in coloration. There continues to be a need to effectively extend the marketing period immediately following the optimum harvest time for grapes.

It is an object of the present invention to provide a specifically-defined improved process to prolong the storage life of grapes with the maintenance of quality for their intended end use.

It is a further object of the present invention to provide a specifically-defined improved process to prolong the storage life of table grapes with the maintenance of the sought-after grape qualities for human consumption, such as flavor, green pliable stems, firmness, and attractive appearance.

These and other objects and advantages of the invention will be apparent to those skilled in grape culture and in the handling and storage of freshly-picked grapes from the following description.

SUMMARY OF THE INVENTION

A process is provided for prolonging the storage life of clusters of grapes while attached to stems with the maintenance of quality for their intended use, comprising:
(a) exposing said clusters of grapes with precooling to a gaseous atmosphere at a reduced temperature to diminish the respiration rate of the grapes,
(b) enclosing the clusters of grapes in a gaseous atmosphere within an enclosure bounded by a semi-permeable film having an oxygen transmission rate of approximately 100 to 400,
(c) introducing carbon dioxide into the gaseous atmosphere of the enclosure to yield a carbon dioxide concentration within the enclosure of approximately 3 to 19 percent by volume, and
(d) placing the resulting enclosure containing the clusters of grapes in a storage zone at a temperature of approximately 31 to 35° F. to achieve a prolonged grape storage life with the maintenance of quality for their intended end use.

A process is provided for prolonging the storage life of table grapes while attached to stems with the maintenance of edible quality for human consumption, comprising:
(a) placing clusters of table grapes while attached to stems in ventilated containers,
(b) placing a plurality of the ventilated containers containing said clusters of grapes in a plurality of stackable ventilated trays that are substantially impervious to moisture,
(c) prior to step (a), prior to step (b), or after step (b) exposing said clusters of grapes with precooling to a gaseous atmosphere at a reduced temperature to diminish the respiration rate of the grapes,
(d) while a plurality of the resulting stackable ventilated trays are stacked enclosing these in an air atmosphere within an enclosure bounded by a semi-permeable film having an oxygen transmission rate of approximately 260 to 325,
(e) introducing carbon dioxide into the air atmosphere of the enclosure to yield a carbon dioxide concentration within the enclosure of approximately 3 to 19 percent by volume and an oxygen concentration within the enclosure of approximately 13 to 18 percent by volume, and
(f) placing the resulting enclosure containing the clusters of table grapes in a storage zone at a temperature of approximately 32 to 34° F. for at least 30 days to achieve a prolonged grape storage life with the maintenance of edible grape quality for human consumption.

BRIEF DESCRIPTION OF THE DRAWINGS

The accompanying drawings, which are incorporated in and constitute a part of the Specification, illustrate a representative preferred arrangement whereby freshly-harvested clusters of table grapes while attached to the stems upon which they were formed undergo prolonged storage in accordance with the process parameters of the present invention.

DESCRIPTION OF PREFERRED EMBODIMENTS

Figure 1:
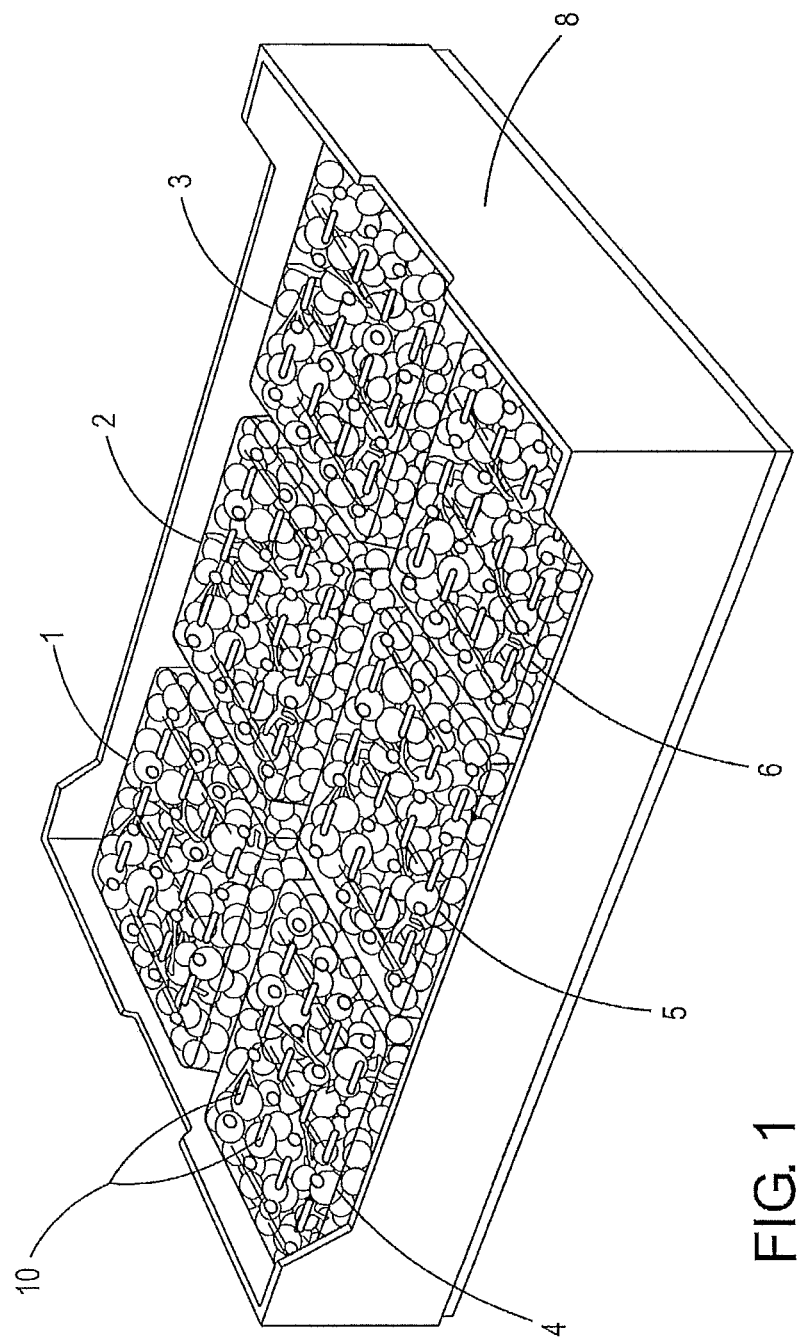
FIG. 1 illustrates a stackable ventilated tray containing six ventilated containers, each containing freshly-harvested grapes attached to stems.

It is essential when practicing the prolonged grape storage process of the present invention that the grapes continue to be attached to the stems upon which they were formed. When the grapes are removed from the stems it is found that the opening of the outer skin of the grapes renders the grapes unsuitable for use in the process.

While not wishing to be bound by the theory of operation of the process of the present invention, it is believed that the time period in which the grapes respire with a continuation of the standard metabolic process is prolonged at a very slow rate during storage and the life of the grapes is advantageously extended. A low prolonged grape respiration is thereby believed to be promoted in an efficient economical manner and to continue at a minimal rate throughout the storage period and to yield a beneficial impact on the shelf life of the grapes. The specified level of carbon dioxide presence in the context of the present invention also has been found to retard the deleterious development of fungal spores that may be present.

The grapes present in clusters that are stored pursuant to the process of the present invention, so long as they are attached to stems, can be of any of the grape type or grape variety. In a preferred embodiment, the grapes are clusters of table grapes for human consumption. Representative table grape varieties that can undergo prolonged storage pursuant to the present invention include 'Blanc Seedless', 'Rouge', 'Red Globe', 'Crimson Seedless', 'Magenta', 'Autumn King', etc. This identification of possible table grape varieties is not considered to be exhaustive and is provided for representative purposes only. Alternatively, grapes primarily intended for juice or wine production advantageously can be placed in storage in accordance with the concept of the present invention.

Prior to entering prolonged storage in accordance with the process of the present invention, it is important that the grapes while attached to stems be maintained under conditions in which their overall quality is not degraded to any noticeable degree. Such grapes ideally should be subjected to the storage process of the present invention within approximately ten days of harvest, and most preferably within approximately two days of harvest. Some grape varieties may require more prompt action than others following harvest, as will be apparent to those skilled in grape culture and handling.

Initially freshly-harvested grapes are precooled and are exposed with precooling to a gaseous atmosphere at a reduced temperature in order to retard and diminish the respiration rate of the grapes. Such reduced temperature also serves to remove excess moisture otherwise adhering to the grapes. The exposure of the grapes to a reduced temperature advantageously is achieved in combination with gas flow (e.g., forced or circulating) in order to expedite the removal of heat and any excess moisture. At the conclusion of such precooling the grapes throughout are at substantially the same temperature as the gaseous atmosphere. Representative cooling temperatures (i.e., refrigeration temperatures) are 31 to 35° F., preferably 32 to 34° F., and most preferably 32° F. Representative precooling times commonly range from 8 to 24 hours (e.g., 8 to 18 hours commonly are adequate) and are influenced by the level of air flow. The preferred gaseous atmosphere for this step of the process is air. It is possible, however, for other additives optionally also be present together with air so long as interference with the overall concept of the present invention is not promoted. For instance, sulfur dioxide could be included in a minimal concentration that does not otherwise harm the grapes.

In accordance with the process of the present invention, the clusters of grapes following such cooling are placed in an enclosure containing a gaseous atmosphere bounded by a semi-permeable film or membrane having the specified oxygen gas transmissibility. Thereby the gas transmissibility is such that a requisite required dynamic breathability and gas transmission is achieved during the prolonged period of grape storage. The semi-permeable film used to form the enclosure exhibits an oxygen transmission rate of approximately 100 to 400, and preferably of approximately 260 to 325, and most preferably approximately 300. The oxygen transmission rate is an indication of the amount of oxygen gas that passes through the semi-permeable film over the specified period. The lower the reading, the more resistant the film is to allowing $O_2$ molecules to pass therethrough. The D3985 standard test method of oxygen gas transmission rate (OTR) through plastic film and sheeting using a standard coulometric sensor can be utilized with the units associated with the expressed oxygen transmission rate being $cm^3$-mil/$m^2$/24 hr.

The semi-permeable film of the specified oxygen transmission rate utilized to form the enclosure commonly has a thickness of approximately 2 to 6 mils, preferably approximately 3 to 4 mils, and most preferably approximately 3 mils. The thickness preferably is sufficient to facilitate handling without a need to use excessive care to avoid inadvertent rupture. As the oxygen transmission rate increases, the semi-permeable film tends to be less robust and to require greater care during handling while seeking to avoid rupture.

Representative semi-permeable films include polyethylene (PE), polypropylene (PP), polyethylene terephthalate (PET), polyvinylchloride, etc. In a preferred embodiment, the semi-permeable film is formed from a thermoplastic polymeric film that readily can be heat sealed when edges of the film abut during the formation of the enclosure. A particularly preferred thermoplastic semi-permeable film is high density polyethylene e.g., having a thickness of approximately 2 to 6 mm. Such a particularly preferred film is commercially available from Accutech Films Inc. of Coldwater, Ohio, U.S.A., as a breathable barrier film.

The clusters of grapes while attached to stems when enclosed by the semi-permeable film of the requisite oxygen transmission rate may be disposed in a wide variety of arrangements. It is essential, however, that the clusters of grapes always have access to the gaseous atmosphere that is provided within the enclosure during storage. For instance, when carrying out the process of the present invention, the clusters of grapes can be supported by one or more ventilated trays.

The ventilated tray can be collapsible or continuously rigid and may or may not be of a reusable character. Such ventilated trays are formed of a material that is impervious to the absorption of moisture. Suitable materials are polymeric in nature or are otherwise at least sealed to display surfaces that lack a propensity to attract and hold moisture (i.e., draw moisture) from the grapes during prolonged storage.

The grapes while attached to stems optionally may be placed in a plurality of breathable ventilated containers prior to being supported on the ventilated trays. The ventilated containers that are placed within a ventilated tray can take the form of pliable polymeric bags or rigid smaller containers, etc. Sufficient spaced openings are present so as to provide gaseous ventilation. For instance, rigid ventilated containers can be formed of a molded (e.g., injection-molded) or thermoformed thermoplastic. One-piece bi-valve plastic containers having a clamshell configuration with a hinge on one edge and two surfaces that close together can be selected. Representative plastics include polystyrene, polyester, polyvinyl chloride, etc.

The formation of an enclosure encompassing the clusters of grapes can be accomplished in any manner capable of completely surrounding the clusters of grapes and thereafter preventing contact of the clusters of grapes with the outside ambient atmosphere during storage other than by restrained passage through the semi-permeable film of the requisite oxygen transmission rate. Such transfer commonly passes through a polymeric semi-permeable film of the requisite oxygen transmission rate primarily by diffusion. In a preferred embodiment, adjoining boundaries of the semi-permeable film are heat sealed through the application of heat applied at the softening temperature of the thermoplastic film followed by solidification when heat is removed. Other representative techniques to adequately join abutting edges of the semi-permeable film when forming the enclosure include use of an adhesive, etc.

The gaseous atmosphere surrounding the grapes at the time of their enclosure by the requisite semi-permeable film can simply be ambient air in a preferred embodiment. Nevertheless, other gaseous atmospheres can be present in the enclosure prior to being at least partially expelled when carbon dioxide is introduced so long as such atmospheres yield no deleterious consequences to the grapes.

Thereafter, carbon dioxide gas controllably is introduced through a valve aperture or other controllable opening provided in the sealed semi-permeable film so as to yield an initial carbon dioxide concentration within the enclosure of approximately 3 to 19 percent by volume, preferably 13 to 18 percent by volume, and most preferably approximately 16 volume percent by volume. Prior to the introduction of carbon dioxide gas, the original gaseous contents of the enclosure can be partially evacuated and/or means can be provided for the controlled egress of the contents of the enclosure as carbon dioxide gas undergoes introduction within the enclosure. Partial gas evacuation and backflushing can be utilized one or more times to achieve the initial specified carbon dioxide concentration within the enclosure.

In a preferred embodiment, an oxygen contact is initially produced within the enclosure of approximately 13 to 18 percent by volume, and most preferably approximately 16 percent by volume in addition to the specified carbon dioxide concentration. Additionally, water vapor commonly may persist in the resulting atmosphere within the enclosure of approximately 90 to 95 percent, and preferably approximately 91 to 94 percent.

It is essential that the clusters of grapes be precooled prior to being enclosed as described. In the process embodiment wherein both ventilated containers and ventilated trays are utilized, the precooling wherein respiration is reduced can be conducted prior to the time the grapes are placed in ventilated containers, prior to the time the grapes are placed in ventilated trays, or after the grapes are placed in ventilated trays. Reduced temperature control is substantially maintained in all embodiments so that the clusters of grapes remain cool and are undergoing a reduced state of respiration when being enclosed and thereafter when introduced to prolonged storage as described hereafter.

The resulting enclosure containing the clusters of grapes is rendered suitable to undergo prolonged storage in a storage zone of a conventional air atmosphere at a temperature of approximately 31 to 35° F., preferably at approximately 32 to 34° F., and most preferably at approximately 32° F. Standard cold storage conditions can be utilized without particular air-flow requirements being necessary.

At the conclusion of the storage period the quality of the grapes is maintained so that they fulfill the prerequisites for their intended use. For instance, table grapes following storage well retain satisfactory flavor, pliable stems, firm texture, and a consumer-acceptable overall appearance. Stored grapes intended for juice or wine production likewise well retain their prerequisite characteristics.

The maximum period of prolonged grape storage that is achievable when practicing the process of the present invention will vary to some degree with the specific variety of grape and the conditions which the harvested grapes encountered prior to their enclosure and storage. Commonly, satisfactory storage durations of 30 days, 60 days or more, or even 90 days, have been demonstrated to be possible. This offers those responsible for the maintenance of grape quality prior to final consumption or other usage a considerable benefit. In all instances during the prolonged storage period the quality of the stored grapes exceeds that achieved when the grapes are similarly stored in an ambient air atmosphere at the same temperature without the presence of carbon dioxide within the enclosure as described herein.

During the grape storage period the relative concentrations of the gases present within the enclosure will vary somewhat in view of the breathable nature of the semi-permeable film utilized to form the enclosure. Accordingly, during the storage period the previously enriched concentration of carbon dioxide within the enclosure will gradually decrease attributable in part to a portion of the carbon dioxide being consumed by the grapes. For instance, if the storage period is long, the concentration of carbon dioxide may drop to as low as approximately 2 to 5 percent by volume, and the oxygen concentration to approximately 13 to 16 percent by volume. Nevertheless, the achievement of satisfactory grape quality is maintained pursuant to the concept of the present invention.

It has been found that during the usage of the specified storage parameters that the growth of any deleterious fungal pathogens accompanying the grapes is effectively suppressed and does not pose an issue that requires remediation. Accordingly, the growth of harmful organisms has been found not to be promoted during the storage period.

The invention is further demonstrated by the following representative illustrative Example. It should be understood that the concept of the invention is not limited to the specific parameters utilized in the Example and illustrated in FIGS. 1, 2, and 3.

EXAMPLE

Within two days of harvest, clusters of table grapes of the 'Blanc Seedless' variety are placed in standard clear polystyrene ventilated containers while continuing to be attached to the stems upon which the grapes were formed. As shown in FIG. 1, six of clear polystyrene ventilated clamshell containers 1, 2, 3, 4, 5, and 6 are placed in a stackable ventilated tray 8 where areas at the sides and ends do not extend completely to the top of the carton, thereby providing openings. The ventilated tray 8 is formed from polyvinyl chloride and is substantially impervious to the absorption of water. Each of the containers 1, 2, 3, 4, 5, and 6 includes a plurality of openings 10 at the lid of each to provide ventilation and exposure of the grape contents to the atmosphere. Each ventilated tray 8 with grapes weighs approximately 20 to 23 lbs.

Thereafter the ventilated trays with clusters of grapes are precooled when placed in cold storage in a forced air atmosphere at a temperature of approximately 32° F. for approximately 8 hours. The respiration rate of the grapes is thereby reduced.

Figure 2:
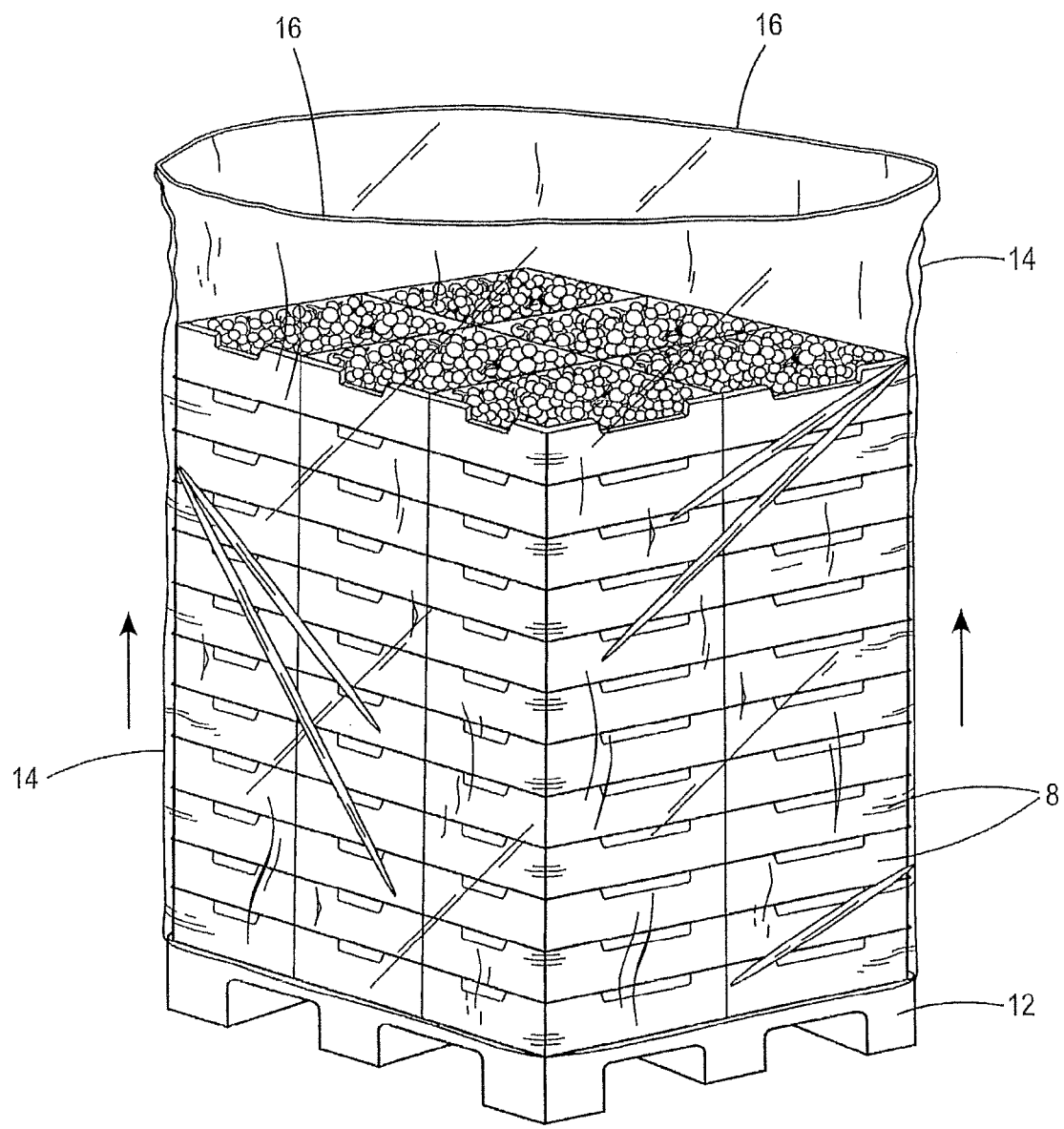
FIG. 2 illustrates a stack of seventy-two ventilated trays each containing six ventilated containers containing freshly-harvested grapes attached to stems as shown in FIG. 1 while the enclosure step of the process is in progress. As shown, the semi-permeable film having the specified oxygen transmission rate encompasses the bottom and sides of the stack of the stackable ventilated trays and has not yet been sealed at the top so as to completely enclose the stackable ventilated trays each containing ventilated containers. As illustrated, a pallet is being used to support the stack of ventilated trays each containing ventilated containers and remains outside the semi-permeable film so that the semi-permeable film will not be damaged as the pallet is engaged by a forklift at the bottom during transport.

As shown in FIG. 2, seventy-two of the stackable ventilated trays 8 containing the grapes within ventilated containers are stacked on a pallet 12 to which a semi-permeable film 14 in the form of a bag previously is placed. As illustrated, the bottom portion of the semi-permeable film in the form of a bag was situated on top of the pallet 12. This arrangement makes possible subsequent transport following lifting with a forklift without damage to film when the pallet is engaged from below. The semi-permeable film is formed of high density polyethylene, is approximately 3 mm in thickness, has an oxygen transmission rate of 300, and is commercially available from Accutech Films, Inc. of Coldwater, Ohio, U.S.A. The upper edges 16 of semi-permeable film 14 are shown to extend upward beyond the stackable ventilated trays 8 while present on pallet 12.

Figure 3:
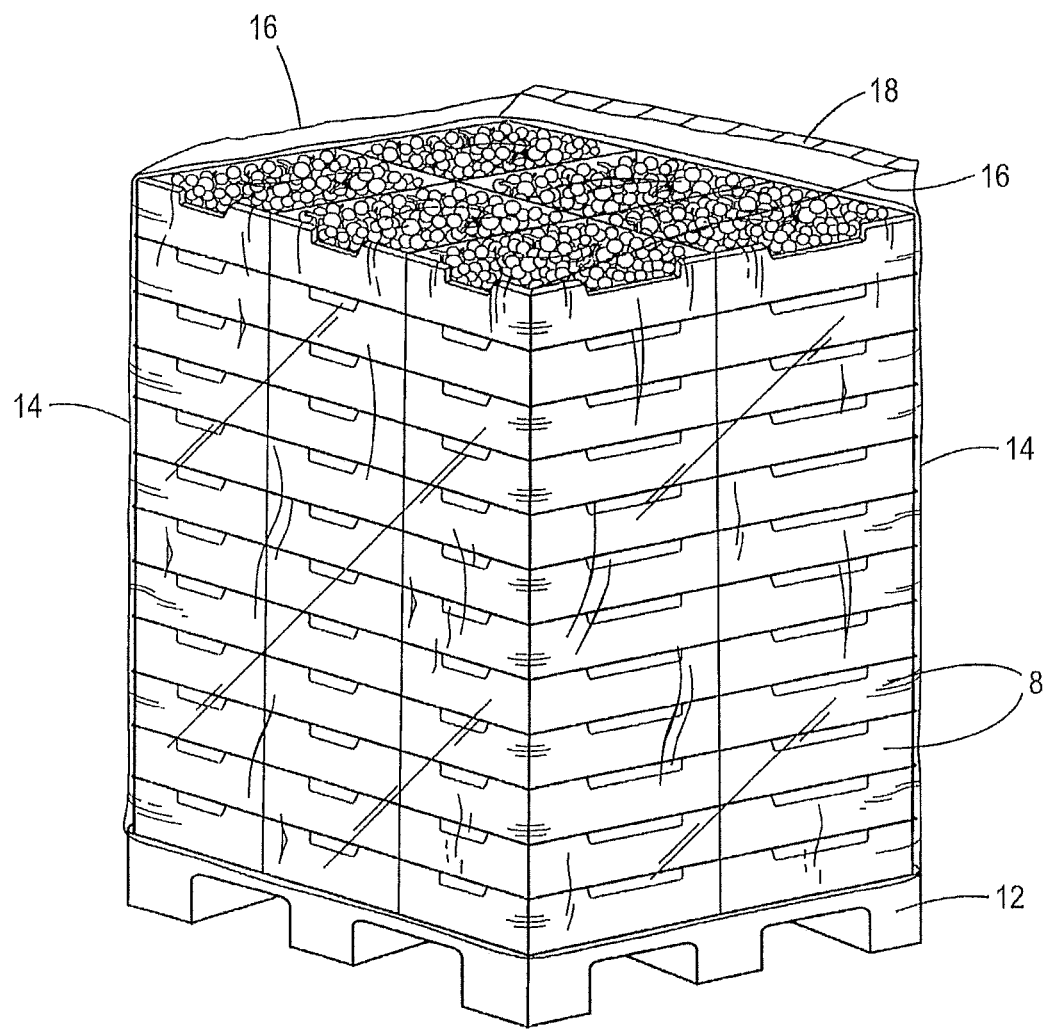
FIG. 3 illustrates the ventilated trays containing ventilated containers during prolonged storage with the semi-permeable film having been sealed at the top so as to completely enclose the ventilated trays containing ventilated containers bearing the clusters of grapes within the requisite semi-permeable film while containing the specified carbon dioxide within the enclosure. In this preferred embodiment, the stack will have a weight of approximately 1500 pounds.

As illustrated in FIG. 3, upper edges 16 of the semi-permeable film 14 next are heat sealed at 18 following softening by the application of heat and solidification following cooling. Any excess semi-permeable film 14 above the heat seal area 18 is trimmed and removed. A port (not shown) with the capability to remove and add gas in a controlled manner extends through the semi-permeable membrane and is provided within the heat sealed area 18 surrounding the stack of stackable ventilated trays 8. The port is provided in sealed engagement through the semi-permeable membrane. While the stackable ventilated trays are stacked, the enclosure bounded by the semi-permeable is formed with the clusters of grapes being present therein in an air atmosphere.

Through the port at the top a portion of the air atmosphere present therein is removed by evacuation. Next, carbon dioxide gas is introduced through the port in a controlled manner to provide a carbon dioxide concentration within the enclosure of approximately 16 percent by volume, an oxygen content within the enclosure of approximately 16 percent by weight volume, and a water vapor content of 94 percent. The carbon dioxide and oxygen contents are determined by the use of a coulometric sensor Model No. 001-412 available from MOCON, Inc. of Minneapolis, Minn., U.S.A., and the moisture content is determined by the use of Series 485 digital hygrometer available from Dwyer Instruments, Inc. of Michigan City, Ind., U.S.A. The resulting stack of stackable ventilated trays 8 containing clusters of grapes while completely enclosed in the semi-permeable film 14 is now ready for prolonged storage. The resulting product of FIG. 3 weighs approximately 1500 lbs., and is capable of being moved when a forklift engages the pallet at the bottom.

The product of FIG. 3 can be stored in air in a standard refrigerated room for 60 days or more at a temperature of 32° F. with the maintenance quality for the intended end use. The table grapes at the conclusion of storage retain an attractive overall appearance, firmness, pleasant taste, and pliable stems with no significant stem dehydration. Such grapes following such prolonged storage can now move in all respects through channels of commerce normally filled exclusively with freshly-harvested grapes.

It will be apparent to those skilled in the art that modifications and variations can be made in the process without departing from the spirit and scope of the invention. It is intended, therefore, that the present invention encompass all such modifications and variations, provided they come within the scope of the appended claims and their equivalents.

What is claimed is:

1. A process for substantially prolonging the storage life of clusters of grapes while attached to stems with the maintenance of quality for their intended use, comprising:
   (a) exposing said clusters of grapes with precooling in an ambient air atmosphere at a reduced temperature of 32 to 34° F. to diminish the respiration rate of the grapes,
   (b) enclosing said clusters of grapes in an ambient air atmosphere within an enclosure bounded by a thermoplastic semi-permeable film having a thickness of approximately 2 to 6 mm and an oxygen transmission rate of approximately 260 to 325 $cm^3$-mil/$m^2$/24 hr.,
   (c) introducing carbon dioxide into said ambient air atmosphere of said enclosure to yield a carbon dioxide concentration within said enclosure of approximately 13 to 18 percent by volume, and
   (d) placing said resulting enclosure containing said clusters of grapes in a storage zone for at least 60 days at a temperature of approximately 32 to 34° F. to achieve a substantially prolonged grape storage life with the maintenance of quality for their intended end use including the maintenance of grape flavor, green pliable stems, and grape firmness and attractive appearance.

2. The process according to claim 1 with step (d) being carried out for at least 60 days, wherein said intended use is maintenance of edible quality for human consumption as a table grape.

3. The process according to claim 1 with step (d) being carried out for at least 60 days, wherein said thermoplastic semi-permeable film of step (b) is a thermoplastic polymeric film that is heat sealed to form said enclosure prior to the introduction of carbon dioxide within said enclosure during step (c).

4. The process according to claim 1 with step (d) being carried out for at least 60 days, wherein said thermoplastic semi-permeable film of step (b) is polyethylene thermoplastic polymeric film having a thickness of approximately 2 to 6 mm.

5. The process according to claim 1 with step (d) being carried out for at least 60 days, wherein at the conclusion of step (c) oxygen is present with said carbon dioxide within said enclosure in a concentration of approximately 13 to 18 percent by volume.

6. The process according to claim 1 with step (d) being carried out for at least 60 days, wherein at the conclusion of step (c) carbon dioxide gas is present in said enclosure in a concentration of approximately 16 percent by volume and oxygen gas is present in said enclosure in a concentration of approximately 16 percent by volume.

7. The process according to claim 1 with step (d) being carried out for at least 60 days, wherein in conjunction with step (c) partial evacuation and backflushing are used one or more times to achieve the specified carbon dioxide concentration within said enclosure.

8. The process according to claim 1 with step (d) being carried out for at least 60 days, wherein during the grape storage of step (d) a storage temperature of approximately 32° F. is substantially maintained.

9. The process according to claim 1 with step (d) being carried out for at least 60 days, wherein prior to step (c) a plurality of said clusters of grapes are supported by a pallet that remains outside the thermoplastic semi-permeable film.

10. The process according to claim 1 with step (d) being carried out for at least 60 days, wherein prior to step (a) said clusters of grapes while attached to stems are supported by one or more ventilated tray that is substantially impervious to absorption of moisture.

11. A process for substantially prolonging the storage life of clusters of table grapes while attached to stems with the maintenance of edible quality for human consumption, comprising:
(a) placing clusters of table grapes while attached to stems in ventilated containers,
(b) placing a plurality of said ventilated containers containing said clusters of grapes in a plurality of stackable ventilated trays that are substantially impervious to the absorption of moisture,
(c) prior to step (a), prior to step (b), or after step (b) exposing said clusters of grapes with precooling to an ambient air atmosphere at a reduced temperature of 32 to 34° F. to diminish the respiration rate of the grapes,
(d) while a plurality of said resulting stackable ventilated trays are stacked enclosing these in an ambient air atmosphere within an enclosure bounded by a thermoplastic semi-permeable film having a thickness of approximately 2 to 6 mm and an oxygen transmission rate of approximately 260 to 325 $cm^3$-mil/$m^2$/24 hr.,
(e) introducing carbon dioxide into said ambient air atmosphere of said enclosure to yield a carbon dioxide concentration within said enclosure of approximately 13 to 18 percent by volume and an oxygen concentration within said enclosure of approximately 13 to 18 percent by volume, and
(f) placing said resulting enclosure containing said clusters of table grapes in a storage zone at a temperature of approximately 32 to 34° F. for at least 60 days to achieve a substantially prolonged grape storage life with the maintenance of edible grape quality for human consumption including the maintenance of grape flavor, green pliable stems, and grape firmness and attractive appearance.

12. The process according to claim 11 with step (f) being carried out for at least 60 days, wherein said thermoplastic semi-permeable film of step (d) is a thermoplastic film that is heat sealed to form said enclosure prior to the introduction of carbon dioxide within said enclosure during step (e).

13. The process according to claim 11 with step (f) being carried out for at least 60 days, wherein said thermoplastic semi-permeable film of step (d) is polyethylene thermoplastic film having a thickness of approximately 2 to 6 mm.

14. The process according to claim 11 with step (f) being carried out for at least 60 days, wherein at the conclusion of step (e) carbon dioxide gas is present in said enclosure in a concentration of approximately 16 percent by volume and oxygen is present in said enclosure in a concentration of approximately 16 percent by volume.

15. The process according to claim 11 with step (f) being carried out for at least 60 days, wherein in conjunction with step (e) partial evacuation and backflushing are used one or more times to achieve the specified carbon dioxide and oxygen concentrations within said enclosure.

16. The process according to claim 11 with step (f) being carried out for at least 60 days, wherein said ventilated containers of step (a) are molded or thermoformed thermoplastic.

17. The process according to claim 11 with step (f) being carried out for at least 60 days, wherein said resulting stack of stackable ventilated trays of step (d) is supported by a pallet that is outside said enclosure bounded by said semi-permeable film.

* * * * *